(12) United States Patent
Breau et al.

(10) Patent No.: US 8,599,776 B1
(45) Date of Patent: Dec. 3, 2013

(54) TRANSFERRING AN ACTIVE WIRELESS VOICE CALL TO A PACKET NETWORK

(75) Inventors: Jeremy R. Breau, Leawood, KS (US); Bejoy Pankajakshan, Olathe, KS (US); Charles Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 590 days.

(21) Appl. No.: 12/862,472

(22) Filed: Aug. 24, 2010

(51) Int. Cl.
*H04B 7/216* (2006.01)

(52) U.S. Cl.
USPC .......................................................... 370/329

(58) Field of Classification Search
USPC .......................................................... 370/329
See application file for complete search history.

(56) References Cited

U.S. PATENT DOCUMENTS

| | | | |
|---|---|---|---|
| 5,896,373 A * | 4/1999 | Mitts et al. | 370/331 |
| 8,000,707 B2 * | 8/2011 | Dalsgaard et al. | 455/436 |
| 2006/0276192 A1 * | 12/2006 | Dutta et al. | 455/436 |
| 2006/0276193 A1 | 12/2006 | Itzkovitz et al. | |
| 2006/0291488 A1 | 12/2006 | Naqvi et al. | |
| 2007/0211694 A1 | 9/2007 | Rasanen | |
| 2008/0037501 A1 * | 2/2008 | Ali et al. | 370/342 |

* cited by examiner

*Primary Examiner* — Sulaiman Nooristany

(57) ABSTRACT

Systems and methods are provided herein for transferring an active voice call to a packet communication network. In a particular embodiment, a method provides establishing a voice call having an initial signaling channel and an initial voice channel between a first wireless device and a second wireless device over a first and second wireless access system. The method further includes establishing a new signaling channel for the voice call between the first wireless device and a separate packet network. Also, the method provides extending the new signaling channel for the voice call from the separate packet network to the second wireless access system over the first wireless access system. Furthermore, the method includes using the new signaling channel to establish a new voice channel for the voice call over the separate packet network, wherein the first wireless access system remains in the new signaling channel.

20 Claims, 6 Drawing Sheets

TRANSFERRING AN ACTIVE WIRELESS VOICE CALL TO A PACKET NETWORK

TECHNICAL BACKGROUND

Wireless communication devices communicate with other devices and systems by connecting to wireless communication systems. Typically a wireless device will use a cellular voice protocol, such as 1x Code Division Multiple Access (CDMA) or the Global System for Mobile communications (GSM). Wireless devices communicating using these protocols are able to transfer between access node without losing connectivity for an in progress call. This transfer process is commonly referred to as handing off between access nodes.

Newer wireless protocols, sometimes referred to as third or fourth generation wireless protocols, are more packet centric wireless protocols. Voice calls with a wireless device over a third or fourth generation protocol may use a packet based protocol, such as Voice over Internet Protocol (VoIP). Transferring an in progress call from a non-packet based connection to a packet based connection may be difficult. The transfer difficulties may cause the call to be dropped due to the difference in access protocols.

OVERVIEW

Systems and methods are provided herein for transferring an active voice call to a packet communication network. In a particular embodiment, a method provides establishing a voice call having an initial signaling channel and an initial voice channel between a first wireless device and a second wireless device over a first wireless access system and a second wireless access system. The method further includes establishing a new signaling channel for the voice call between the first wireless device and a separate packet network. Also, the method provides extending the new signaling channel for the voice call from the separate packet network to the second wireless access system over the first wireless access system. Furthermore, the method includes using the new signaling channel to establish a new voice channel for the voice call between the first wireless device and the second wireless access system over the separate packet network and to remove the initial voice channel for the voice call between the first wireless device and the second wireless access system over the first wireless access system, wherein the first wireless access system remains in the new signaling channel.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
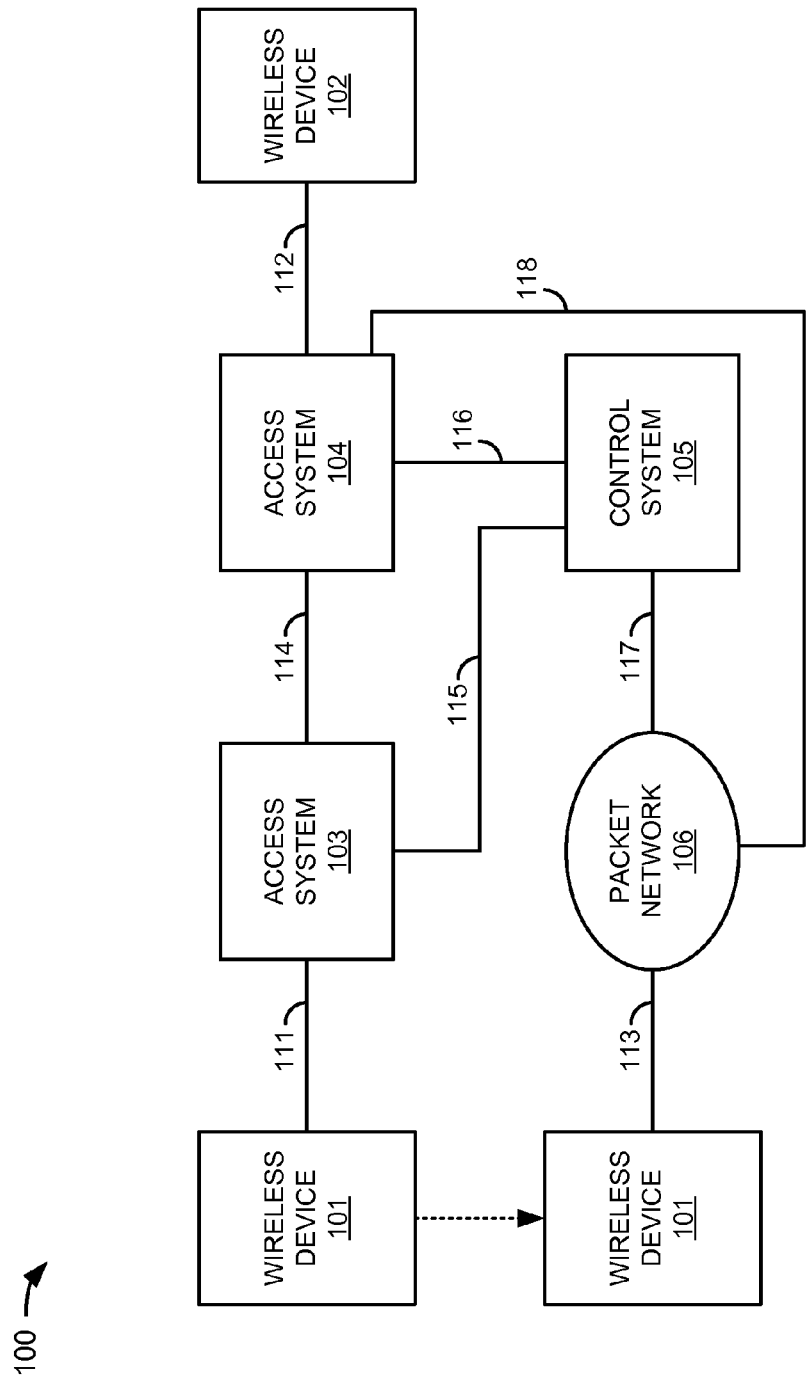
FIG. 1 illustrates a wireless communication system.

FIG. 1 illustrates communication system 100. Communication system 100 includes wireless communication device 101, wireless communication device 102, wireless access system 103, wireless access system 104, communication control system 105, and packet network 106. Wireless communication device 101 and wireless access system 103 communicate over wireless link 111. Wireless communication device 102 and wireless access system 104 communicate over wireless link 112. Wireless communication device 101 and packet communication network 106 communicate over wireless link 113. Wireless access system 103 and wireless access system 104 communicate over communication link 114. Wireless access system 104 and communication control system 105 communicate over communication link 116. Wireless access system 103 and communication control system 105 communicate over communication link 115. Packet communication network 106 and control system 105 communicate over communication link 117. Packet communication network 106 and wireless access system 104 communicate over communication link 118.

Wireless devices 101 and 102 may communicate with access systems 103 and 104, respectively, via wireless access nodes, such as cellular base stations Likewise, wireless device 101 may communicate with packet network 106 via a wireless access node. The wireless access node used to communicate with packet network 106 may be the same or different from the access node used to communicate with access system 103.

In operation, wireless device 101 is capable of communicating using various wireless communication protocols. Wireless device 101 communicates with access system 103 using a cellular voice protocol such as 1x Code Division Multiple Access (CDMA). Additionally, wireless device 101 communicates with packet network 106 using a packet cellular protocol, such as the fourth generation cellular protocol Long Term Evolution (LTE), to exchange voice communications over the packet network. The voice communications over packet network 106 may be Voice over Internet Protocol (VoIP) communications or some other packet based voice protocol.

The multiple voice formats and wireless protocols make switching between the two protocols difficult while wireless device 101 is participating in a voice call. For example, a call may be dropped when wireless device 101 transfers from access system 103 to packet network 106.

Figure 2:
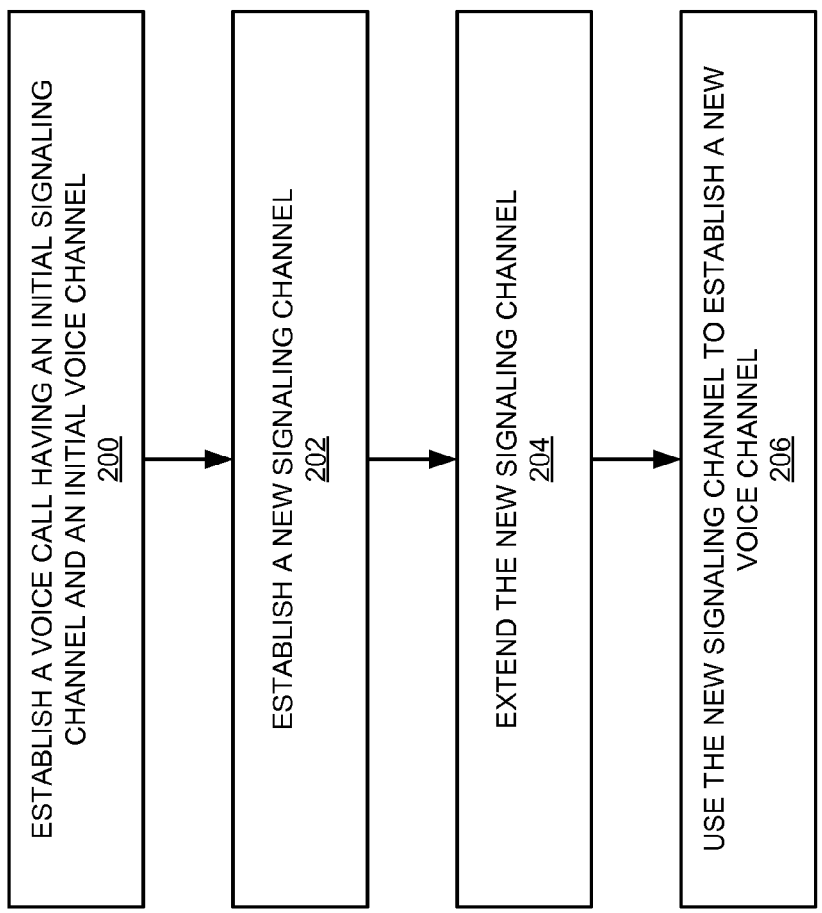
FIG. 2 illustrates the operation of a wireless communication system.

FIG. 2 illustrates the operation of wireless communication system 100. Access system 103 establishes a voice call having an initial signaling channel and an initial voice channel between wireless device 101 and wireless device 102 over access system 103 and access system 104 (step 200). The voice call may be initiated by either wireless device 101 or wireless device 102. The initial signaling and voice channels may be the voice and signaling channels associated with a cellular voice protocol, such as 1x CDMA or the Global System for Mobile Communications (GSM). In particular, wireless links 111 and 112 may use 1x CDMA while link 114 may use packet based communications to communicate between access system 103 and access system 104. Although, each link may use alternative communication formats.

Wireless device 101 then transfers from communicating with a cellular voice protocols over link 111 to communicating with a packet based communication protocol, such as LTE or WiMax, over wireless link 113. This process may include transferring from communicating with an access node for wireless link 111 to communicating with an access node for wireless link 113 and is sometimes referred to as handing off. Wireless link 113 allows wireless device 101 to communicate with packet network 106. Wireless device 101 may physically move in order to achieve the wireless signal connectivity necessary establish wireless link 113, as indicated by the dotted arrow of FIG. 1, or wireless device 101 may have stayed in the same location and switched network access links.

Upon gaining communications with packet network 106, wireless device 101 may notify communication control system 105 that wireless device 101 is now communicating over packet network 106 rather than access system 103. Communication control system 105 establishes a new signaling channel for the voice call between wireless device 101 and packet network 106 (step 202). The new signaling channel may be a session initiation protocol (SIP) signaling channel. Packet network 106 is separate from access systems 103 and 104.

Additionally, communication control system 105 extends the new signaling channel for the voice call from packet network 106 to access system 104 over access system 103 (step 204). The new signaling channel may span links 114, 115, 116, control system 105, and link 117 to packet network 103 or may take other paths and include other intermediate systems.

Communication control system 105 then uses the new signaling channel to establish a new voice channel for the voice call between wireless device 101 and access system 104 over packet network 106 (step 206). Also, communication control system 105 removes the initial voice channel for the voice call between wireless device 101 and access system 104 over access system 103. Access system 103 remains in the new signaling channel.

Therefore, the process of FIG. 2 begins with wireless device 101 participating in a cellular voice call with wireless device 102 via access system 103 and access system 104. Both voice and control signaling pass through access systems 103 and 104. The process ends with the same voice call having voice data now routed through packet network 106 to and from access system 104 while call signaling routes through packet network 106 through control system 105 and access system 103 to access system 104. Thus, access system 103 still participates in the control signaling for the voice call even though the voice data no longer routes through access system 103.

Referring back to FIG. 1, wireless communication devices 101 and 102 comprise Radio Frequency (RF) communication circuitry and an antenna. The RF communication circuitry typically includes an amplifier, filter, modulator, and signal processing circuitry. Wireless communication devices 101 and 102 may also include a user interface, memory device, software, processing circuitry, or some other communication components. Wireless communication devices 101 and 102 may be a telephone, computer, e-book, mobile Internet appliance, wireless network interface card, media player, game console, or some other wireless communication apparatus—including combinations thereof.

Wireless access systems 103 and 104 each comprise a computer system and communication interface. Wireless access systems 103 and 104 may also include other components such a router, server, data storage system, and power supply. Wireless access systems 103 and 104 each may reside in a single device or may be distributed across multiple devices. Wireless access systems 103 and 104 could each be an base station controller, Internet protocol base station controller, mobile switching center, network gateway system, Internet access node, application server, service node, or some other communication system—including combinations thereof.

Communication control system 105 comprises a computer system and communication interface. Communication control system 105 may also include other components such a router, server, data storage system, and power supply. Communication control system 105 may reside in a single device or may be distributed across multiple devices. Communication control system 105 may be an Internet protocol multimedia subsystem (IMS) platform, network gateway system, Internet access node, application server, service node, or some other communication system—including combinations thereof.

Packet communication network 106 is a communication network that comprises telephony switches, wireless access nodes, Internet routers, network gateways, computer systems, communication links, or some other type of communication equipment—including combinations thereof.

Wireless links 111-113 uses the air or space as the transport media. Wireless links 111-112 may use various protocols, such as Code Division Multiple Access (CDMA), Global System for Mobile Communication (GSM), or some other wireless communication format. Wireless link 113 may use various protocols for packet based wireless communications, such as Worldwide Interoperability for Microwave Access (WIMAX), Long Term Evolution (LTE), Wireless Fidelity (WIFI), or some other wireless communication format. Communication links 114-118 use metal, glass, air, space, or some other material as the transport media. Communication links 114-118 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 114-118 could be direct links or may include intermediate networks, systems, or devices.

Figure 3:
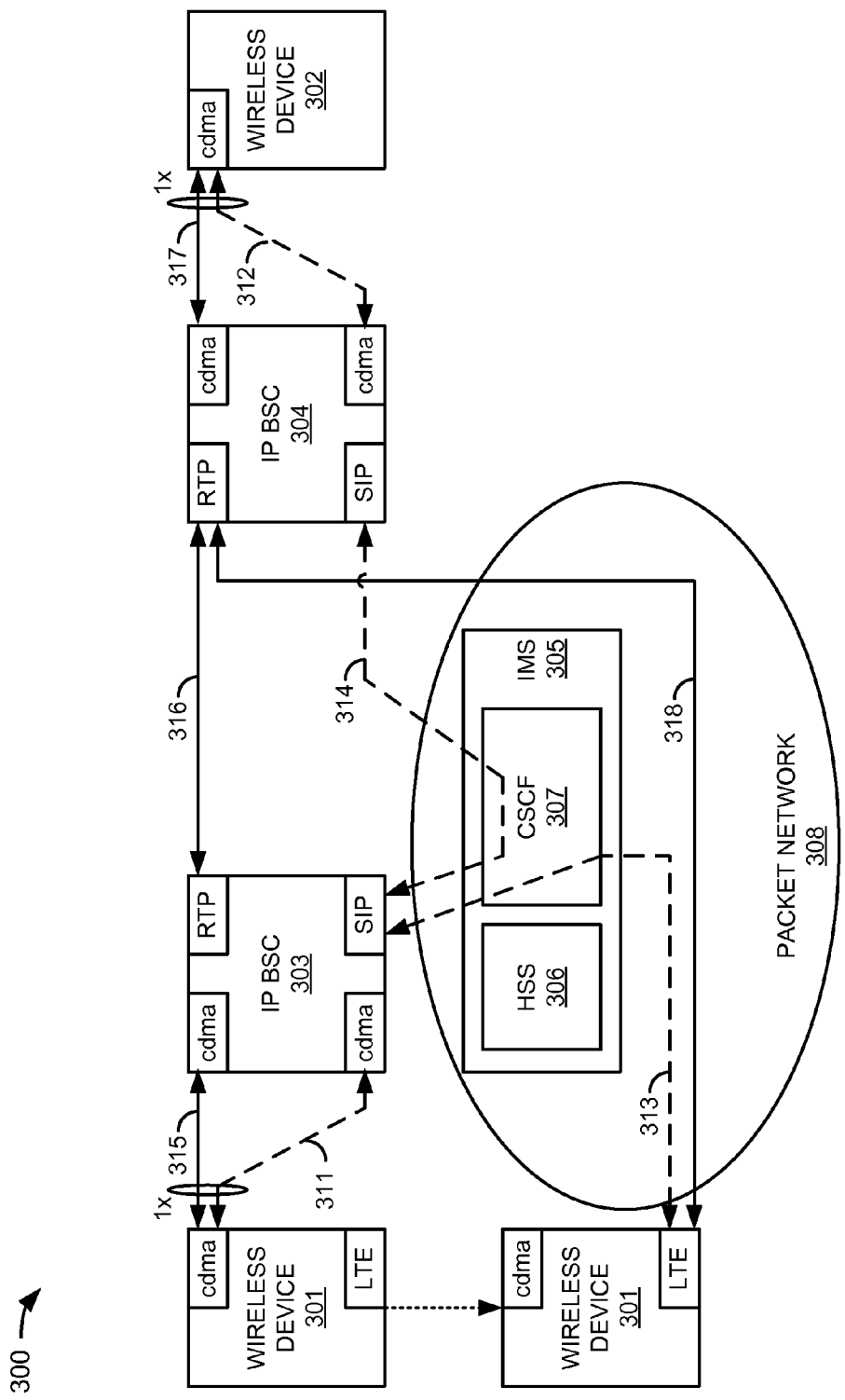
FIG. 3 illustrates a wireless communication system.

FIG. 3 illustrates communication system 300. Communication system 300 includes wireless communication device 301, wireless communication device 302, Internet protocol base station controller (IP BSC) 303, IP BSC 304, packet network 308, and Internet protocol multimedia subsystem (IMS) platform 305 within packet network 308, which includes home subscriber server (HSS) 306 and call state control function (CSCF) 307. The arrows shown between elements of communication system 300 are abstract representations of various voice and signaling paths that will be described below. The dashed lines represent signaling paths for control communications while the solid lines represent voice paths for voice communications. Though links are not shown, the signal paths may use links similar to those described for communication system 100 of FIG. 1.

Figure 4:
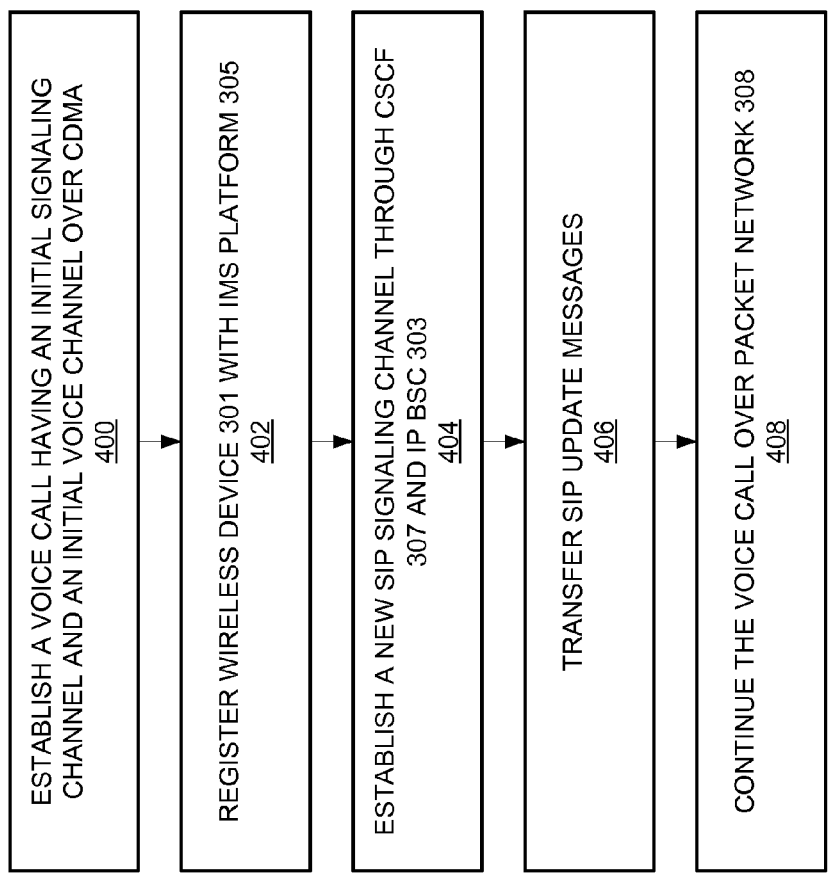
FIG. 4 illustrates the operation of a wireless communication system.

FIG. 4 illustrates the operation of communication system 300. A voice call having an initial signaling channel and an initial voice channel is established between wireless device 301 and wireless device 302 (step 400). Voice paths 315 and 317 in the initial voice channel are 1x CDMA paths. The voice call is established through IP BSC 303 and IP BSC 304. Voice path 316 between IP BSC 303 and IP BSC 304 uses Real-time Transfer Protocol (RTP). The voice call may have been initiated by either wireless device 301 or wireless device 302. The initial signaling channel between wireless devices 301 and 302 and IP BSCs 303 and 304 are paths 311 and 312, respectively.

At a point in time during the voice call, wireless device 301 transfers from the 1x CDMA connection that was initially used to connect with IP BSC 303 to an LTE connection. The dotted arrow in FIG. 3 represents the move from CDMA to LTE, however, wireless device 301 may not need to move physically in order to achieve LTE connectivity. LTE is a packet based communication protocol that is considered to be a fourth generation wireless protocol. The LTE protocol provides that voice communications may be exchanged as packet communications with wireless communication device 301. Thus, voice communications over LTE may operate in a manner similar to Voice over Internet Protocol (VoIP).

Upon moving to the LTE connection, wireless device 301 registers with IMS platform 305 through HSS 306 (step 402). IMS platform 305 provides or acts as an intermediary for packet based services, such as voice calls, for wireless devices. Registering with IMS platform 305 allows IMS platform 305 to recognize that wireless device 301 is now operating on packet network 308 over LTE.

In response to wireless device 301 registering connection, a new session initiation protocol (SIP) signaling channel for the call is established between wireless device 301 and packet network 308 that the LTE connection allows wireless device 301 to access (step 404). The SIP signaling channel follows paths 313 and 314 through CSCF 307 to exchange control signaling between wireless device 301 and IP BSCs 303 and 304.

After the SIP signaling channel is created, wireless device 301 transfers a SIP update message to IP BSC 303 (step 406). The update message is transferred over path 313 in the SIP signaling channel. The update message indicates to IP BSC 303 that wireless device 301 is now operating on packet network 308. The update message further includes a SIP address for wireless device 301. IP BSC 303 transfers a SIP update message to IP BSC 304 indicating the SIP address for wireless device 301 (step 406). Once IP BSC 304 knows the SIP address for wireless device 301, IP BSC 304 can route voice communications for the voice call to wireless device 301 over path 318. Additionally, IP BSC 303 transfers a SIP update message to wireless device 301 indicating the SIP address of IP BSC 304 (step 406). Once wireless device 301 knows the SIP address for IP BSC 304, wireless device 301 can route voice communications for the voice call to IP BSC 304 over path 318.

After all SIP update messages have been transferred, the voice call that was initiated by wireless device 301 over 1x CDMA continues over LTE and packet network 308 (step 408). The signaling channel for control signals between wireless device 301 and IP BSC 304 continues through IP BSC 303 via paths 313, 314, and CSCF 307. The voice channel between wireless device 301 and IP BSC 304 does not go through IP BSC 303 but, instead, travels through packet network 308 on path 318. Path 318 connects with the packet network via the LTE link from wireless device 301 and the RTP link from IP BSC 304. During the above process, wireless device 302 continues to access IP BSC 304 using 1x CDMA path 317. Any changes that occur regarding the transference of wireless device 301 to from 1x CDMA to LTE are transparent to wireless device 302. Thus, the call between wireless device 301 and wireless device 302 continues uninterrupted by the switch to LTE by wireless device 301.

Upon completion of the call, IP BSC 303 may be dropped from the signaling path. Thus, any subsequent calls to and from wireless device 301 while wireless device 301 is connected using LTE may not need signaling paths routed through IP BSC 303.

Figure 5:
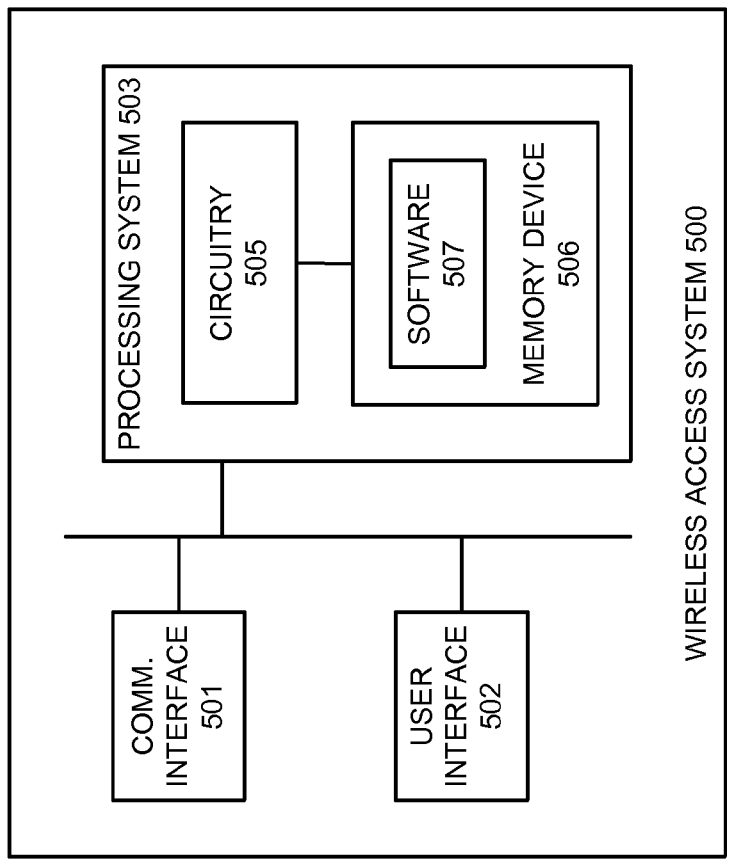
FIG. 5 illustrates a wireless access system.

FIG. 5 illustrates wireless access system 500. Wireless access system 500 is an example of wireless access system 103, although control system 103 may use alternative configurations. Wireless access system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a disk drive, flash drive, data storage circuitry, or some other memory apparatus. Operating software 507 comprises computer programs, firmware, or some other form of machine-readable processing instructions. Operating software 507 may include an operating system, utilities, drivers, network interfaces, applications, or some other type of software. When executed by circuitry 505, operating software 507 directs processing system 503 to operate wireless access system 500 as described herein.

In particular, communication interface 501 establishes a voice call having an initial signaling channel and an initial voice channel between a first wireless device and a second wireless device over wireless access system 500 and a second wireless access system.

Figure 6:
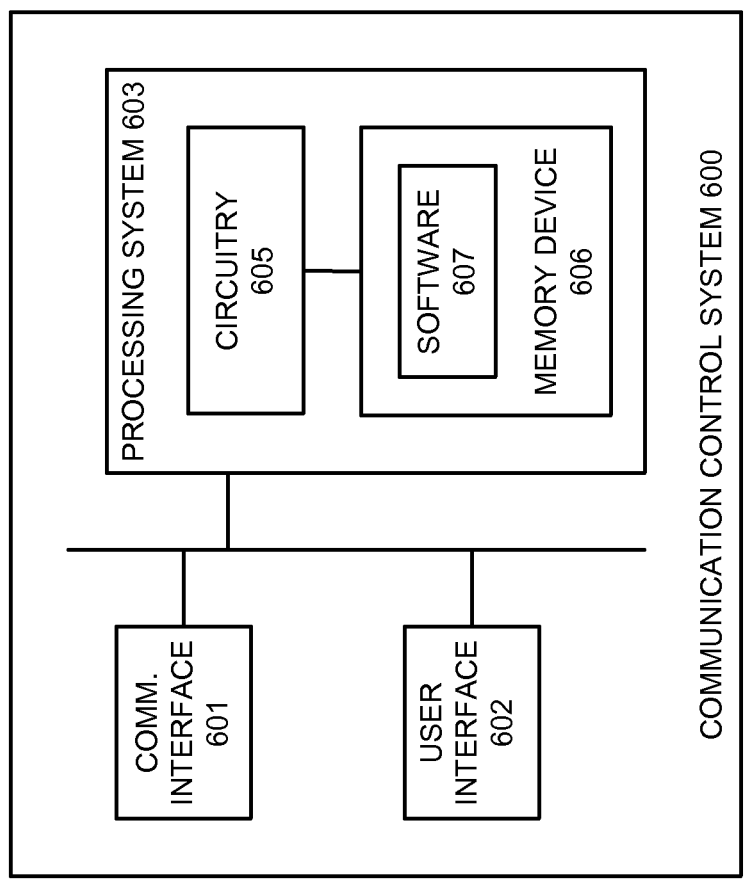
FIG. 6 illustrates a communication control system.

FIG. 6 illustrates communication control system 600. Communication control system 600 is an example of communication control system 105, although control system 105 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate communication control system 600 as described herein.

In particular, communication interface 601 establishes a new signaling channel for the voice call between the first wireless device and a separate packet network, and extends the new signaling channel for the voice call from the separate packet network to the second wireless access system over the first wireless access system. Communication interface 601 uses the new signaling channel to establish a new voice channel for the voice call between the first wireless device and the second wireless access system over the separate packet network and to remove the initial voice channel for the voice call between the first wireless device and the second wireless access system over the first wireless access system, wherein the first wireless access system remains in the new signaling channel.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
    establishing a voice call having an initial signaling channel and an initial voice channel between a first wireless device and a second wireless device over a first wireless access system and a second wireless access system, wherein the first wireless access system uses a cellular voice protocol;
    establishing a new signaling channel for the voice call between the first wireless device and a separate packet network, wherein the separate packet network uses a cellular packet based protocol and the new signaling channel uses a voice over packet control protocol;
    extending the new signaling channel for the voice call from the separate packet network to the second wireless access system over the first wireless access system; and
    using the new signaling channel to establish a new voice channel for the voice call between the first wireless device and the second wireless access system over the separate packet network, wherein the first wireless access system does not remain in the new voice channel, and to remove the initial voice channel for the voice call between the first wireless device and the second wireless access system over the first wireless access system, wherein the first wireless access system remains in the new signaling channel between the separate packet network and the second wireless access system.

2. The method of claim 1 further comprising transferring a message from the first wireless access system to the second wireless access system indicating a new media address for the first wireless device.

3. The method of claim 1 further comprising transferring an update message to the first wireless access system over the new signaling channel.

4. The method of claim 1 further comprising resolving the first wireless access system to a packet address on the new signaling channel.

5. The method of claim 1 wherein the separate packet network is accessed by a Long Term Evolution wireless link with the first wireless device.

6. The method of claim 1 wherein the first wireless device accesses the first wireless access system via a 1x code division multiple access link.

7. The method of claim 1 wherein a link between the first and second wireless access system uses Real-time Transfer Protocol.

8. The method of claim 1 wherein the new signaling channel is a SIP control channel.

9. The method of claim 1 wherein the first and second wireless access systems are Internet protocol base station controllers.

10. The method of claim 1 wherein an Internet protocol multimedia subsystem platform is in the new signaling path.

11. A communication system comprising:
    a first wireless access system configured to establish a voice call having an initial signaling channel and an initial voice channel between a first wireless device and a second wireless device over the first wireless access system and a second wireless access system, wherein the first wireless access system uses a cellular voice protocol;
    a communication control system, including processing circuitry, configured to establish a new signaling channel for the voice call between the first wireless device and a separate packet network, wherein the separate packet network uses a cellular packet based protocol and the new signaling channel uses a voice over packet control protocol, extend the new signaling channel for the voice call from the separate packet network to the second wireless access system over the first wireless access system, and use the new signaling channel to establish a new voice channel for the voice call between the first wireless device and the second wireless access system over the separate packet network, wherein the first wireless access system does not remain in the new voice channel, and to remove the initial voice channel for the voice call between the first wireless device and the second wireless access system over the first wireless access system, wherein the first wireless access system remains in the new signaling channel between the separate packet network and the second wireless access system.

12. The system of claim 11 wherein the first wireless access system is further configured to transfer a message to the second wireless access system indicating a new media address for the first wireless device.

13. The system of claim 11 further comprising the first wireless device configured to transfer an update message to the first wireless access system over the new signaling channel.

14. The system of system 11 further comprising the first wireless device configured to resolve the first wireless access system to a packet address on the new signaling channel.

15. The system of claim 11 wherein the first wireless device accesses the separate packet network by a Long Term Evolution wireless link.

16. The system of claim 11 wherein the first wireless device accesses the first wireless access system via a 1x code division multiple access link.

17. The system of claim 11 wherein a link between the first and second wireless access system uses Real-time Transfer Protocol.

18. The system of claim 11 wherein the new signaling channel is a SIP control channel.

19. The system of claim 11 wherein the first and second wireless access systems are Internet protocol base station controllers.

20. The system of claim 11 wherein the communication control system is an Internet protocol multimedia subsystem platform in the new signaling path.

* * * * *